United States Patent
Switzer et al.

(10) Patent No.: US 9,109,353 B1
(45) Date of Patent: Aug. 18, 2015

(54) MOUNTING ASSEMBLY AND METHOD FOR CONNECTING SIDEWALL PANELS TO A SUPPORT STRUCTURE

(71) Applicant: The Boeing Company, Chicago, IL (US)

(72) Inventors: Lon E. Switzer, Marysville, WA (US); Elliot L. Howell, Mill Creek, WA (US); Nicholas J. Lewis, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/965,723

(22) Filed: Aug. 13, 2013

(51) Int. Cl.
*E04B 2/30* (2006.01)
*E04F 13/08* (2006.01)

(52) U.S. Cl.
CPC .............. *E04B 2/30* (2013.01); *E04F 13/0862* (2013.01)

(58) Field of Classification Search
CPC ............ B64C 1/066; B64C 1/18; B64C 1/06; B64C 1/12; F16B 5/0607; F16B 5/0685; E04B 2/30; E04F 13/0862
USPC ............. 244/117 R, 119, 120, 123.1, 123.12, 244/123.2, 123.3, 124.4, 123.7, 125, 126, 244/129.1, 131, 132; 52/346, 29, 385
See application file for complete search history.

(56) References Cited

U.S. PATENT DOCUMENTS

| | | | | |
|---|---|---|---|---|
| 2,219,714 A * | 10/1940 | Sperry | ........................ | 52/481.2 |
| 2,877,970 A * | 3/1959 | Miller et al. | .................. | 244/119 |
| 2,925,050 A * | 2/1960 | Candlin, Jr. et al. | .......... | 105/397 |
| 3,289,372 A * | 12/1966 | Adams et al. | ................... | 52/346 |
| 3,664,513 A * | 5/1972 | Atwater | ........................ | 211/134 |
| 3,791,096 A * | 2/1974 | Epperlein | ..................... | 403/315 |
| 3,976,269 A * | 8/1976 | Gupta | ............................ | 244/119 |
| 4,074,491 A * | 2/1978 | Bell et al. | ....................... | 52/394 |
| 4,796,837 A * | 1/1989 | Dowd | ....................... | 244/122 R |
| 4,799,631 A * | 1/1989 | Humphries et al. | ........ | 244/118.5 |
| 4,936,527 A * | 6/1990 | Gorges | ........................ | 244/118.6 |
| 5,067,287 A * | 11/1991 | Lewis | ................. | 52/29 |
| 5,484,198 A * | 1/1996 | Pilliod | ..................... | 312/334.18 |
| 5,806,797 A * | 9/1998 | Micale | .......................... | 244/120 |
| 5,876,024 A * | 3/1999 | Hain | ......................... | 267/141.4 |
| 6,086,018 A * | 7/2000 | Gobeil et al. | .............. | 244/122 R |
| 6,712,316 B2 * | 3/2004 | Jones | ............................ | 244/132 |
| 6,786,453 B2 * | 9/2004 | Jones | ......................... | 244/129.3 |
| 6,871,822 B2 * | 3/2005 | Guard et al. | ................... | 244/131 |
| 7,118,069 B2 * | 10/2006 | Novak et al. | .................. | 244/119 |
| 7,416,157 B2 * | 8/2008 | Guard et al. | ................... | 244/131 |
| 7,478,781 B2 * | 1/2009 | Granzeier et al. | ............ | 244/131 |
| 7,527,223 B2 * | 5/2009 | Ebner et al. | ................... | 244/131 |
| 7,578,478 B2 * | 8/2009 | Guard et al. | ................... | 244/131 |
| 7,775,479 B2 * | 8/2010 | Benthien | ................... | 244/122 R |
| 7,901,004 B2 * | 3/2011 | Figueras Mitjans | .......... | 297/257 |
| 8,544,176 B2 * | 10/2013 | Delort | ......................... | 29/897.32 |
| 8,544,796 B2 * | 10/2013 | Pozzi et al. | ................. | 244/118.6 |
| 2002/0195595 A1 * | 12/2002 | Shepherd | ........................ | 256/25 |
| 2004/0021039 A1 * | 2/2004 | Jones | ........................ | 244/131 |
| 2004/0206853 A1 * | 10/2004 | Guard et al. | .............. | 244/117 R |
| 2006/0118676 A1 * | 6/2006 | Novak et al. | ................. | 244/129.1 |
| 2007/0266655 A1 * | 11/2007 | Howe et al. | ................... | 52/282.1 |
| 2008/0156934 A1 * | 7/2008 | Guard et al. | ................... | 244/119 |
| 2008/0193063 A1 * | 8/2008 | Chen et al. | ....................... | 384/45 |

(Continued)

*Primary Examiner* — James Ference
(74) *Attorney, Agent, or Firm* — Walters & Wasylyna LLC

(57) ABSTRACT

A mounting assembly for connecting a sidewall panel to a support structure may include a rail configured to connect to a sidewall panel, and a retainer bracket moveably connected to the rail, wherein the retainer bracket is configured to connect to a support structure.

15 Claims, 8 Drawing Sheets

(56) References Cited

U.S. PATENT DOCUMENTS

| | | | |
|---|---|---|---|
| 2008/0258007 A1* | 10/2008 | Guard et al. | 244/119 |
| 2009/0179111 A1* | 7/2009 | Ebner et al. | 244/131 |
| 2011/0101194 A1* | 5/2011 | Wetzig et al. | 248/429 |
| 2011/0167745 A1* | 7/2011 | Sondermann | 52/312 |
| 2011/0233337 A1 | 9/2011 | Pozzi et al. | |

* cited by examiner

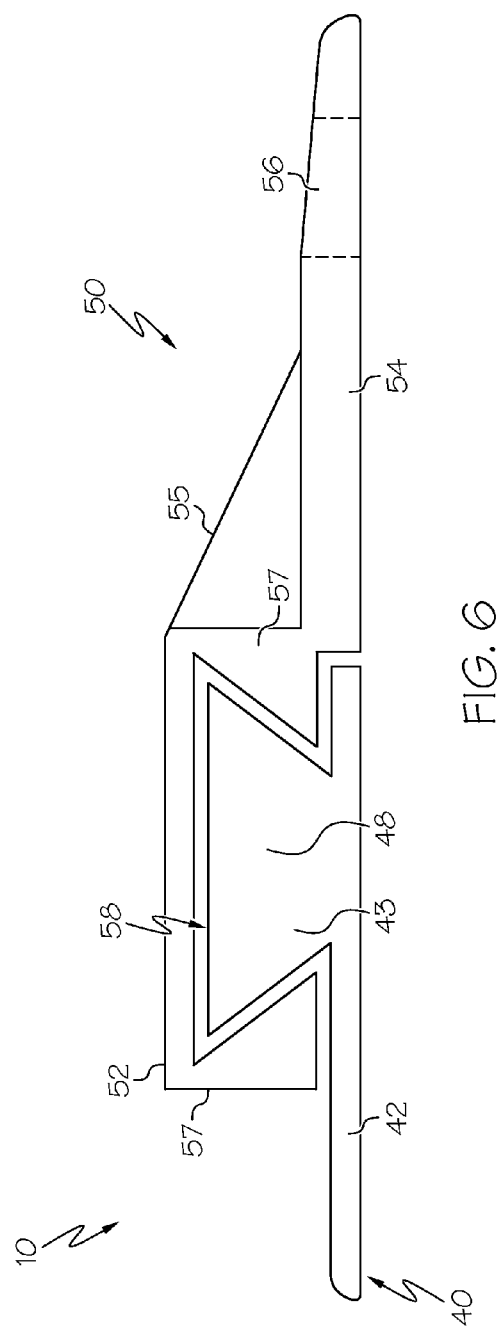
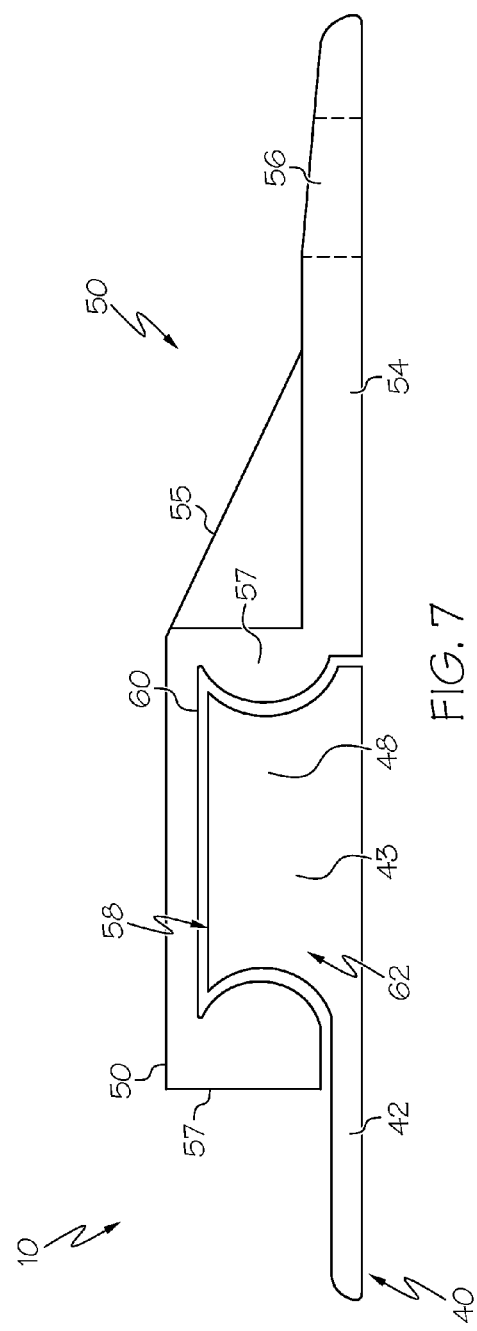

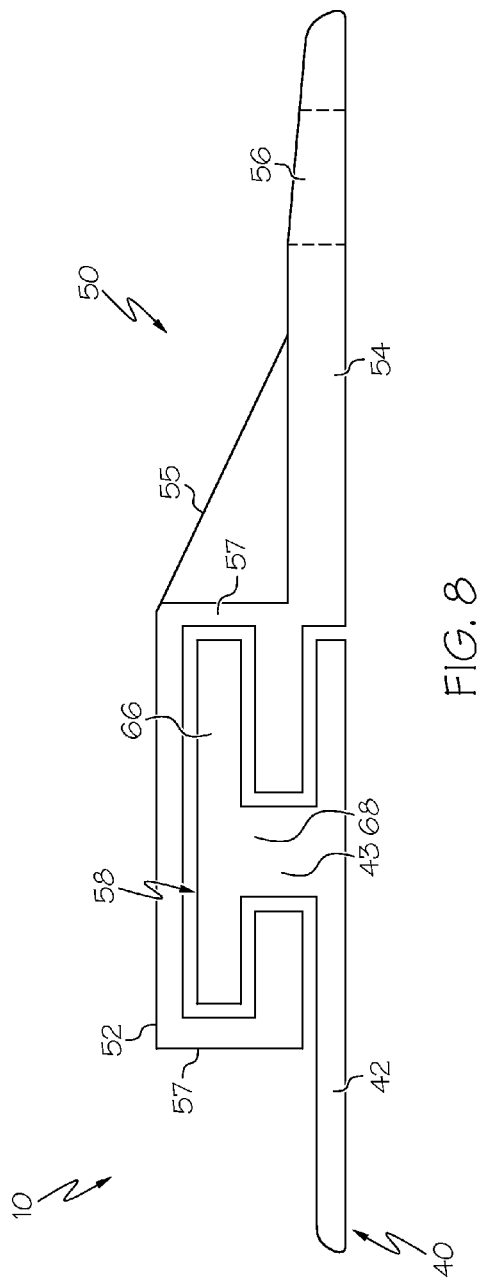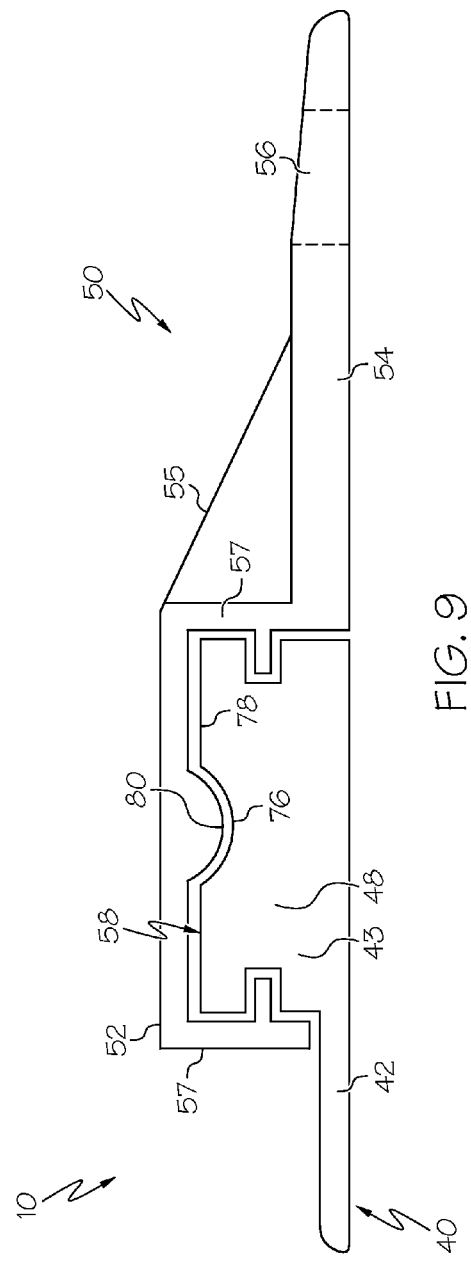

MOUNTING ASSEMBLY AND METHOD FOR CONNECTING SIDEWALL PANELS TO A SUPPORT STRUCTURE

FIELD

The present disclosure is generally related to sidewall panels and, more particularly, to a mounting assembly for a sidewall panel that is configured to enhance and improve fabrication and installation of the sidewall panels.

BACKGROUND

Aircraft are typically constructed with three layers of thermal-acoustic insulation for protecting the passenger cabin from exposure to any harmful environment and undesired noise. For example, these layers may include an outer aluminum or composite skin, an intermediate fiberglass batting, and an inner shell. Typically, the inner shell includes a combination of sidewall panels and cabin flooring mounted on frame members of the airframe.

It is not uncommon to use twenty or more different edge retainers, tabs and/or slot fasteners to install the sidewall panels to different types of frame members and at different locations on the airframe of an aircraft. Manufacturers are ordinarily required to form the retainers and fasteners within precise locations on each sidewall panel for allowing proper installation of the sidewall panel on the airframe. In doing so, manufacturers usually employ clamping tools and marking instruments for constructing the sidewall panels within the desired tolerances.

As a result, ensuring that the correct retainers are installed on the sidewall panels and that the retainers are installed at the correct location on each sidewall panel may be somewhat cumbersome, thereby increasing manufacturing cycle time and costs associated therewith. In cases where an incorrect retainer is installed to the sidewall panel or the retainer is installed at an incorrect location on the sidewall panel, the entire sidewall panel must be rebuilt. This can result in further wasted manufacturing costs and time.

In addition, despite the combination of retainers, fasteners, and/or bonding adhesives, the sidewall panels may propagate beyond a desired position on the airframe. As a result, the sidewalls may require frequent readjustment to the desired position. This sort of continuous maintenance is undesirable.

Accordingly, those skilled in the art continue with research and development efforts in the field of connecting wall panels to an underlying support structure, particularly related to the installation of sidewall panels forming the interior cabin of an aircraft.

SUMMARY

In one embodiment, the disclosed mounting assembly for connecting a sidewall panel to a support structure may include a rail configured to connect to a sidewall panel, and a retainer bracket moveably connected to the rail, wherein the retainer bracket is configured to connect to a support structure.

In another embodiment, the disclosed mounting assembly for connecting a sidewall panel to a support structure may include a sidewall panel including a surface and a perimeter edge, at least one rail connected to the sidewall panel, and at least one retainer bracket slidably connected to the rail, wherein the retainer bracket is configured to connect to an airframe of an aircraft.

In another embodiment, also disclosed is a method for connecting a sidewall panel to a support structure, the method may include the steps of: (1) providing a sidewall panel, (2) providing a mounting assembly including at least one rail and at least one retainer bracket, (3) connecting the rail to the sidewall panel, (4) slidably connecting the retainer bracket to the rail, (5) positioning the sidewall panel proximate a support structure, (6) positioning the retainer bracket with respect to the support structure, and (7) connecting the retainer bracket to the support structure.

Other embodiments of the disclosed mounting assembly for connecting a sidewall panel to a support structure will become apparent from the following detailed description, the accompanying drawings and the appended claims.

BRIEF DESCRIPTION OF THE DRAWINGS

FIG. 6 is a cross-sectional view, taken along section line 5-5 of FIG. 4, of another embodiment of the disclosed mounting assembly;

FIG. 7 is a cross-sectional view, taken along section line 5-5 of FIG. 4, of another embodiment of the disclosed mounting assembly;

FIG. 8 is a cross-sectional view, taken along section line 5-5 of FIG. 4, of another embodiment of the disclosed mounting assembly;

FIG. 9 is a cross-sectional view, taken along section line 10-10 of FIG. 4, of another embodiment of the disclosed mounting assembly;

DETAILED DESCRIPTION

Figure 1:
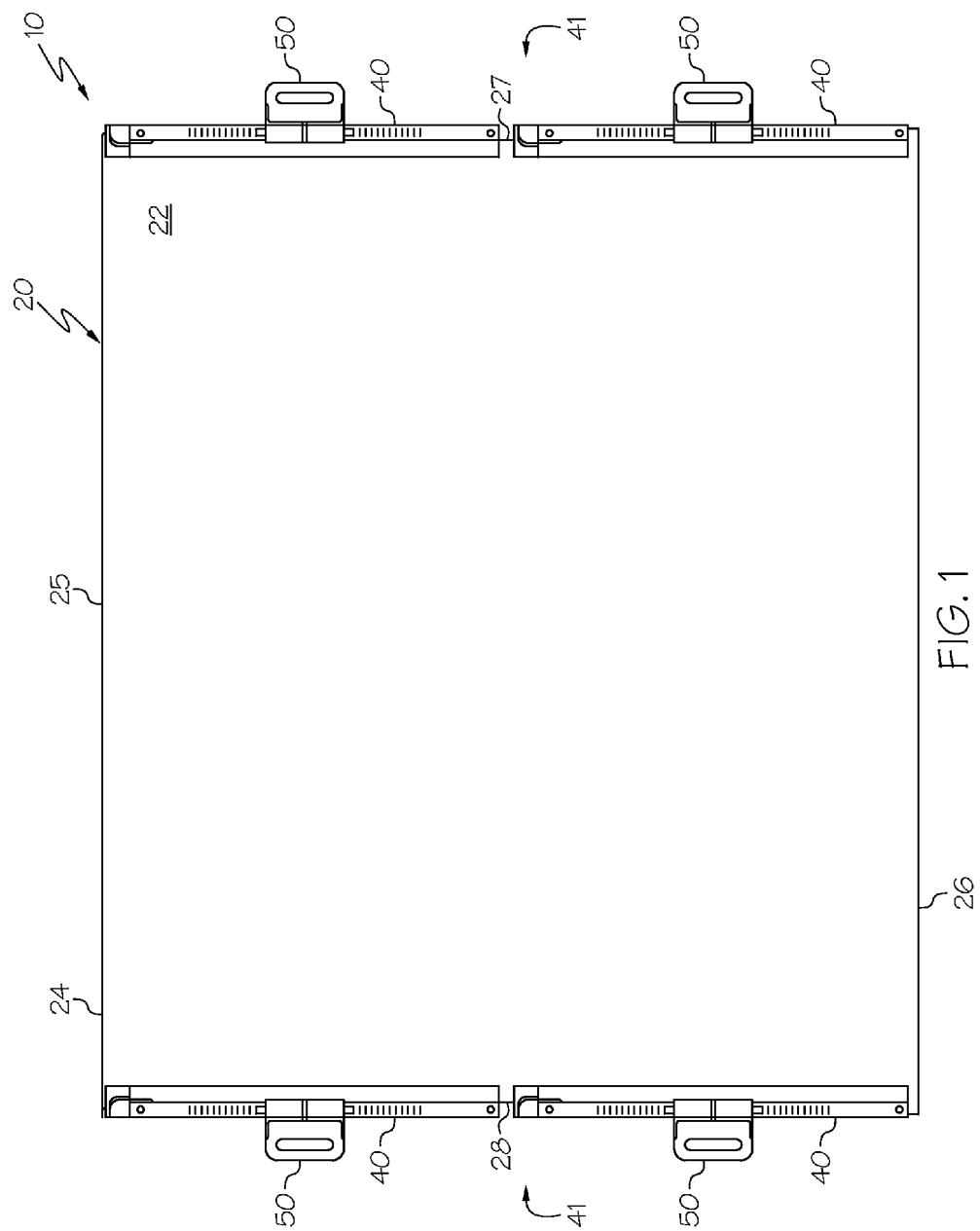
FIG. 1 is a rear elevational view of one embodiment of the disclosed mounting assembly for a sidewall panel.

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

Figure 2:
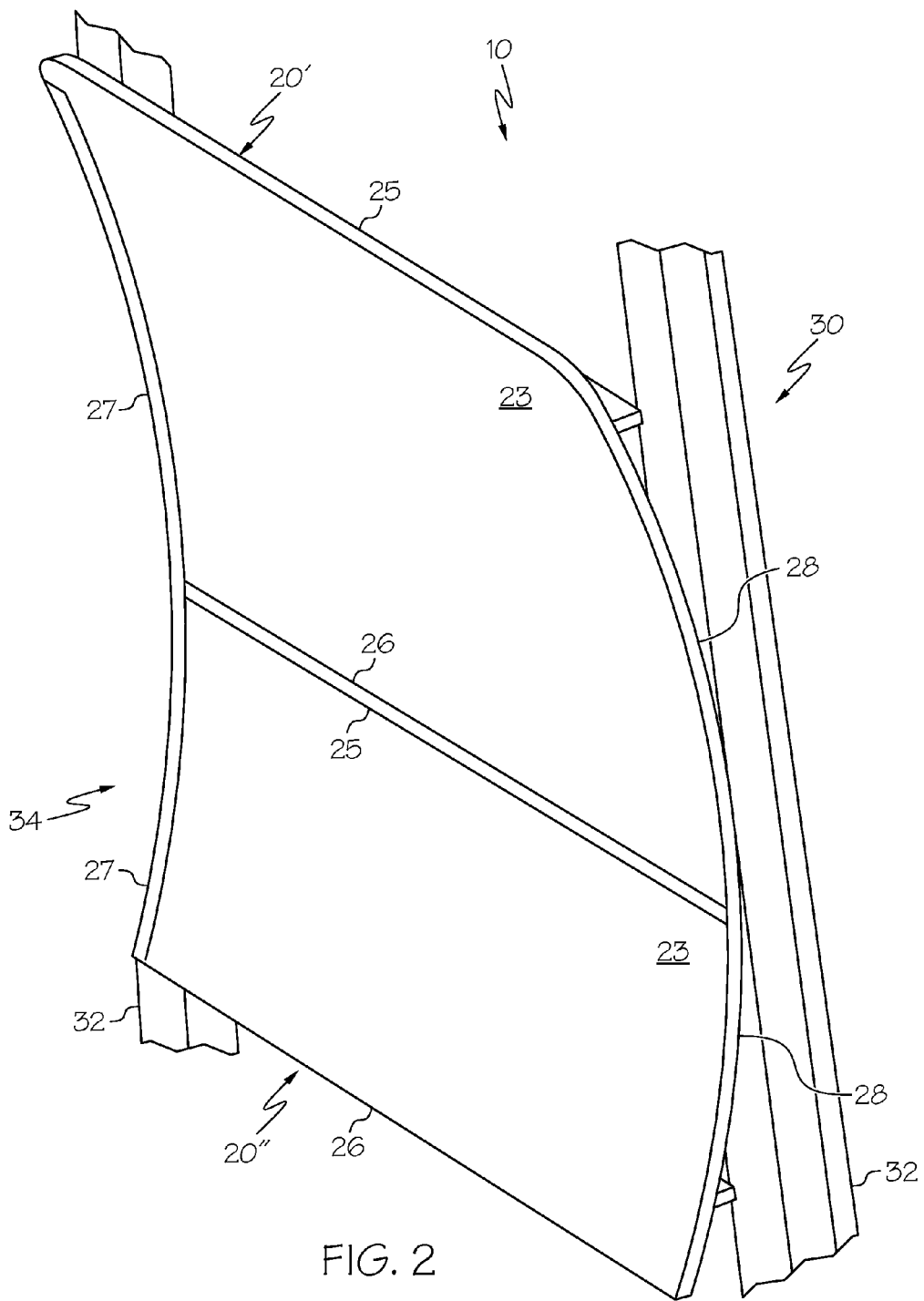
FIG. 2 is a front and side perspective view of the disclosed mounting assembly for a sidewall panel depicting the sidewall panel being connected to a frame.

Referring to FIGS. 1 and 2, the disclosed mounting assembly, generally designated 10, may be configured to connect a sidewall panel 20 to a support structure 30. The mounting assembly 10 may include at least one rail 40 connected to the sidewall panel 20 and a retainer bracket 50 configured to be slidably connected to the rail 40. The retainer bracket 50 may be configured to be connected to the support structure 30 to connect the sidewall panel 20 to the support structure 30.

The support structure 30 (FIG. 2) may be any rigid member or structure sufficient to support one or more sidewall panels 20. The support structure 30 may be positioned rearwardly of the sidewall panel 20. The support structure 30 may include one or more frame members 32. The frame members 32 may form a structural support frame of the support structure 30. For example and without limitation, the support structure 30 may be an airframe of an aircraft and the frame members 32 may include formers, stringers, or other frame members of the airframe.

The sidewall panel 20 may include a first major surface (e.g., back surface) 22 (FIG. 1) and a second major surface (e.g., front surface) 23 (FIG. 2). The sidewall panel may include any shape (e.g., perimeter shape), such as square, rectangular, or the like. The sidewall panel 20 may include at least one perimeter edge 24. For example, the sidewall panel 20 may include a first (e.g., upper) edge 25, a second (e.g., lower) edge 26 opposite the first edge 25, a third (e.g., left side) edge 27 extending between the first edge 25 and the second edge 26, and a fourth (e.g., right side) edge 28 extending between the first edge 25 and the second edge 26 opposite the third edge 27.

The sidewall panel 20 may be substantially planar. For example, the first major surface 22 (FIG. 1) and the second major surface 23 (FIG. 2) may be substantially flat. Alternatively, the sidewall panel 20 may be curved. For example, the first major surface 22 may be substantially convex and the second major surface 23 may be substantially concave, as illustrated in the FIG. 2. As another example, the first major surface 22 may be substantially concave and the second major surface 23 may be substantially convex. The curve of the sidewall panel 20 may extend from the first edge 25 to the second edge 26 or from the third edge 27 to the fourth edge 28.

The sidewall panel 20 may be made of any material suitable for use as a wall structure connected to and supported by the support structure 30. For example, the sidewall panel 20 may be made of a substantially rigid material, a semi-rigid material, or a flexible material. Further, the sidewall panel 20 may be made from one or more materials having appropriate acoustic, thermal, and/or smoke density properties suitable for use as an interior cabin wall of an aircraft. For example and without limitation, the sidewall panel 20 may include a sandwich panel made from a phenolic resin, fiberglass composite facing with a KEVLAR® fiber paper in a honeycomb pattern and phenolic resin core.

Those skilled in the art will appreciate that a plurality of sidewall panels 20 may be connected to the support structure 30 to form an overall wall structure 34. For example, as illustrated in FIG. 2, a first sidewall panel 20' may be connected to the support structure 30 at a first position and a second sidewall panel 20" may be connected to the support structure 30 at a second position (e.g., aligned with and below the first sidewall panel 20'). Additional sidewall panels 20 may be connected to the support structure 30 to form the overall wall structure 34.

Referring still to FIGS. 1 and 2, one or more rails 40 may be connected to a surface of the sidewall panel 20 at appropriate locations for attachment of the sidewall panel 20 to the support structure 30 via the one or more retainer brackets 50 moveably connected to the rails 40. For example, one or more rails 40 may be connected to a surface (e.g., back surface 22) of the sidewall panel 20 proximate one or more perimeter edges 24 of the sidewall panel 20.

In an example construction, one or more rails 40 may be connected to the back surface (e.g., first major surface 22) of the sidewall panel 20 proximate at least one substantially vertical perimeter edge 24 (e.g., third edge 27 and/or fourth edge 28), such that the retainer brackets 50 are appropriately positioned for connection to one or more substantially vertical frame members 32 of the support structure 30 (FIG. 2).

In another example construction, one or more rails 40 may be connected to the back surface 22 of the sidewall panel 20 proximate at least one substantially horizontal perimeter edge 24 (e.g., first edge 27 and/or second edge 28), such that the retainer brackets 50 are appropriately positioned for connection to one or more substantially horizontal frame members 32 of the support structure 30 (FIG. 2).

In another example construction, one or more rails 40 may be connected to the back surface 22 of the sidewall panel 20 at any position interior to or between opposed perimeter edges 24. Further, the rails 40 may be positioned on the sidewall panel 20 at any appropriate orientation for alignment with and connection to corresponding frame members 32 of the support structure 30 (e.g., at any non-zero angular position with respect to a perimeter edge 24 of the sidewall panel 20).

The sidewall panel 20 may include various dimensions (e.g., a length dimension, a width dimension, and a thickness dimension). Each rail 40 may be suitably sized to extend at least partially the length and/or width of the sidewall panel 20. For constructions where the sidewall panel 20 is rectangular, the length of the perimeter edges 24 (e.g., edges 25, 26, 27, 28) of the sidewall panel 20 may define the length and the width of the sidewall panel 20. Each rail 40 may be suitably sized to extend at least partially the length of the corresponding perimeter edge 24 of the sidewall panel 20 to which it is connected.

For example, the rail 40 may include a length substantially equal to the length of the perimeter edge 24 of the sidewall panel 20 to which it is connected. As another example, the rail 40 may include a length substantially less than the length of the perimeter edge 24 of the sidewall panel 20 to which it is connected. For example, the rail 40 may extend at least approximately 25 percent of the length of the edge 24 to which it is connected. As another example, the rail 40 may extend at least approximately 50 percent of the length of the edge 24 to which it is connected. As another example, the rail 40 may extend at least approximately 75 percent of the length of the edge 24 to which it is connected. As another example, the rail 40 may extend approximately 100 percent of the length of the edge 24 to which it is connected.

As illustrated in FIG. 1, in an example construction, a plurality of rails 41 (e.g., two rails 40) may be connected to the sidewall panel 20 proximate each vertical perimeter edge 24 (e.g., third edge 27 and fourth edge 28). Each rail 40 may include a length substantially less than the length of the corresponding perimeter edge 27, 28 to which it is connected, such that the plurality of rails 41 may extend substantially the length of the perimeter edge 27, 28 to which they are connected.

In another example construction, a single rail 40 may be connected to the sidewall panel 20 proximate each vertical perimeter edge 24 (e.g., third edge 27 and fourth edge 28). Each rail 40 may include a length substantially equal to the length of the corresponding perimeter edge 27, 28 to which it is connected.

Rails 40 that are connected to the sidewall panel 20 proximate an intersection of perimeter edges 24 (e.g., a corner defined by first edge 25 and third edge 27) may include a lip 70 (FIG. 3) disposed on an end 72 of the rail 40. The lip 70 may be configured to engage the perimeter edge 24 of the sidewall panel 20 perpendicular to the perimeter edge 24 to which the rail 40 is connected. For example, the lip 70 may project outwardly from the end 72 of the rail support 42 (e.g., generally perpendicularly with respect to the bottom surface 44 of the rail support 42).

Figure 3:
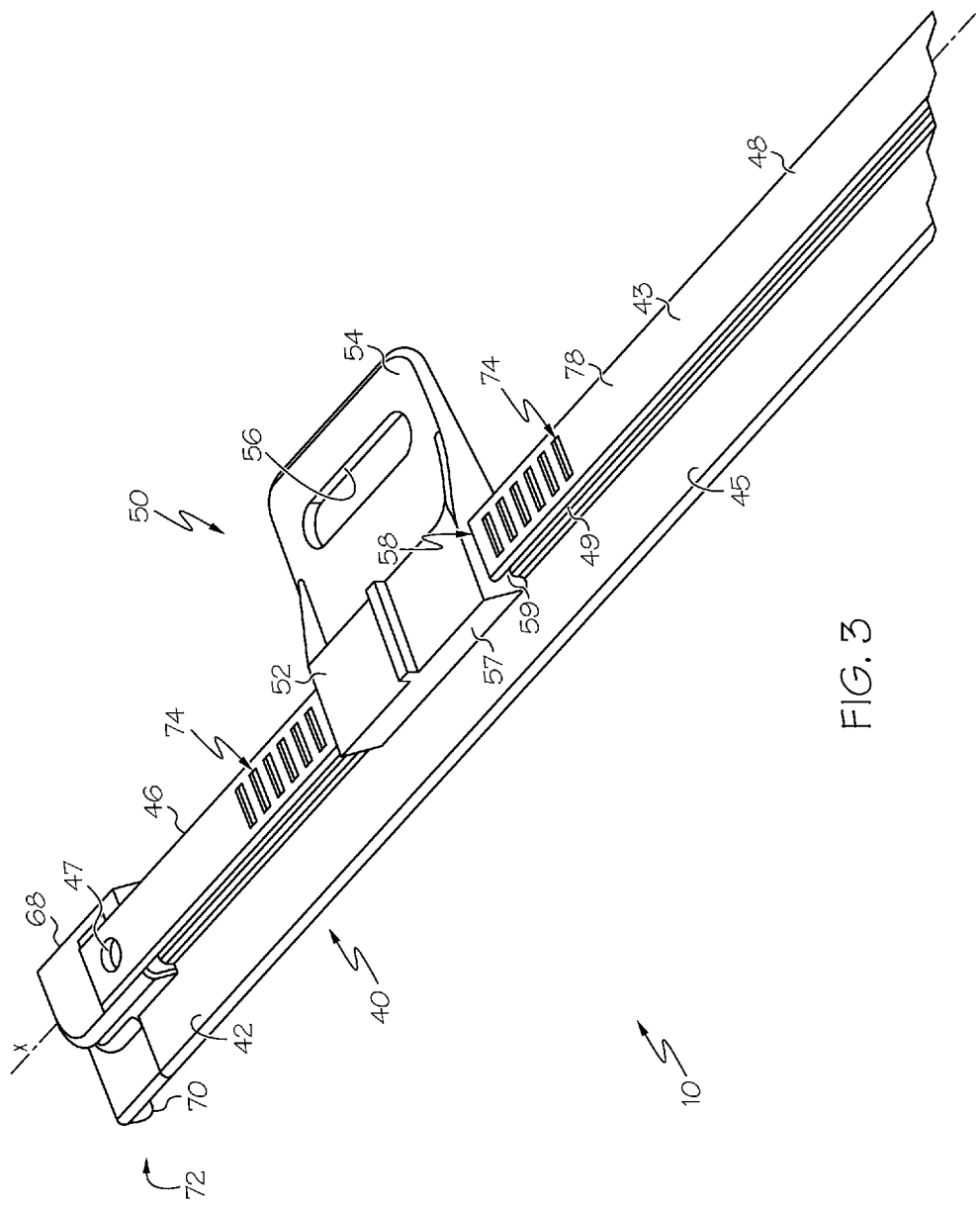
FIG. 3 is a back and side perspective view of the disclosed an embodiment of the disclosed mounting assembly.

Referring to FIG. 3, the rail 40 may include a rail support 42 and a rail guide 43. The rail support 41 may include a first surface (e.g., bottom surface) 44 (FIG. 4) and an opposed second surface 45 (e.g., top surface). The bottom surface 44 may be configured to make flush contact with the surface (e.g., back surface 23) of the sidewall panel 20 to which it is connected. For example, the bottom surface 44 may be substantially planar for connection of the rail 40 to a substantially planar sidewall panel 20. As another example, the bottom surface 44 may be curved for connection of the rail 40 to a curved sidewall panel 20.

The rail 40 may be connected to the surface (e.g., back surface 23) of the sidewall panel 20 (FIG. 1) by any appropriate or desired manner. For example, the rail 40 may be connected to the sidewall panel 20 by rivets, screws, adhesives, thermal bonding, or any other suitable attachment or fastening mechanism. For constructions where the rail 40 is connected to the sidewall panel 20 with mechanical fasteners, the rail 40 may include one or more fastening apertures 47. As another example, the rail 40 may be integrally formed with the sidewall panel 20.

The rail guide 43 may extend outwardly from the rail support 42. For example, the rail guide 43 may extend substantially perpendicularly from the top surface 45 of the rail support 42. The rail guide 43 may extend substantially the length of the rail support 42. The rail guide 43 may extend at least part of the width of the rail support 42.

The rail guide 43 may be configured to support moveable connection of the retainer bracket 50 to the rail 40. For example, the rail guide 43 may be configured to provide a slidable engagement of the retainer bracket 50, such that the retainer bracket 50 may move longitudinally along a length of the rail guide 43.

The retainer bracket 50 may include a bracket support 52 and a bracket flange 54. The bracket support 52 may be configured to slidably connect to the rail guide 43. The bracket flange 54 may extend outwardly from the bracket support 52. For example, the bracket flange 54 may extend generally perpendicularly from a side of the bracket support 52. Optionally, struts 55 (FIG. 5) may extend from the bracket support 52 to the bracket flange 54 to resist angular movement of the bracket flange 54 relative to the bracket support 52.

The bracket flange 54 may extend beyond an edge of the rail 40. In an example construction, the rail guide 43 may be positioned proximate a longitudinal edge 46 of the rail support 42, such that the bracket flange 54 extends beyond the longitudinal edge 46 of the rail support 42.

Referring back to FIG. 1, in an example construction, one or more rails 40 may be connected to the sidewall panel 20 proximate one or more perimeter edges 24 of the sidewall panel 20. For example, each rail 40 may be positioned such that the longitudinal edge 46 of the rail 40 is adjacent to and aligned with a corresponding perimeter edge 24 (e.g., third edge 27 and fourth edge 28) of the sidewall panel 20. Upon connection of the rails 40 to the sidewall panel 20, the bracket flange 54 may extend beyond the corresponding perimeter edge 24 (e.g., third edge 27 and fourth edge 28) to which the rail 40 is connected. The retainer bracket 50 may be connected to the frame member 32 for connection of the sidewall panel 20 to the support structure 30 (FIG. 2).

The size of the bracket flange 54 and the distance the bracket flange 54 extends from the bracket support 52 (and accordingly the distance the bracket flange 54 extends from the perimeter edge 24 of the sidewall panel 20) may depend upon various factors including, but not limited to, the location and configuration of the frame members 32 of the structural support 30 (FIG. 2).

While only one bracket 50 is shown connected to the rail 40 in the illustrated embodiments, those skilled in the art will appreciate that a plurality of brackets 50 may be slidably connected to the rail guide 43 of each rail 40. The number of brackets 50 may depend upon various factors including, but not limited to, the number of points of connection needed to adequately secure the sidewall panel 20 to the support structure 30 (FIG. 2), the configuration of the support structure 30, the size of the sidewall panel 20, the number of rails 40 connected to the sidewall panel 20, and other factors.

Referring again FIG. 3, the retainer bracket 50 may be configured to be connected to the frame member 32 of the structural support 30 (FIG. 2). The bracket flange 54 may be connected to the frame member 32 by any appropriate or desired manner. For example, the bracket flange 54 may be connected to the frame member 32 by rivets, screws, bolts, adhesives, thermal bonding, welding, or any other suitable attachment or fastening mechanism. For constructions where the retainer bracket 50 is connected to the frame member 32 with mechanical fasteners, the bracket flange 54 may include one or more fastening apertures 56. For example, the fastening aperture 56 may be an elongated slot.

Optionally, a mounting layer (not shown) may be disposed between the bracket flange 54 and the frame member 32 (FIG. 2). The mounting layer may be formed of any desirable material, such as an elastomeric material or other material suitable for damping or eliminating vibrations that may otherwise be transmitted from the frame member 32 to the bracket flange 54 and thus to the rail 40. In one particular embodiment, the mounting layer may be formed of an elastomeric material, a thermoplastic elastomer (TPE), a siloxane compound, a modified silicone, or any other suitable material or combination of materials.

Figure 4:
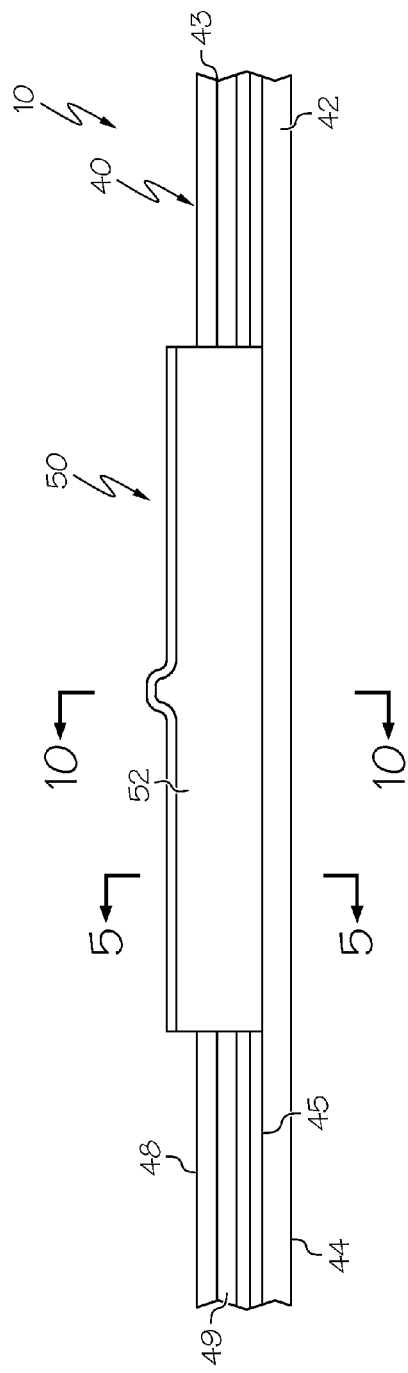
FIG. 4 is a side elevational view of the disclosed mounting assembly.
Figure 5:
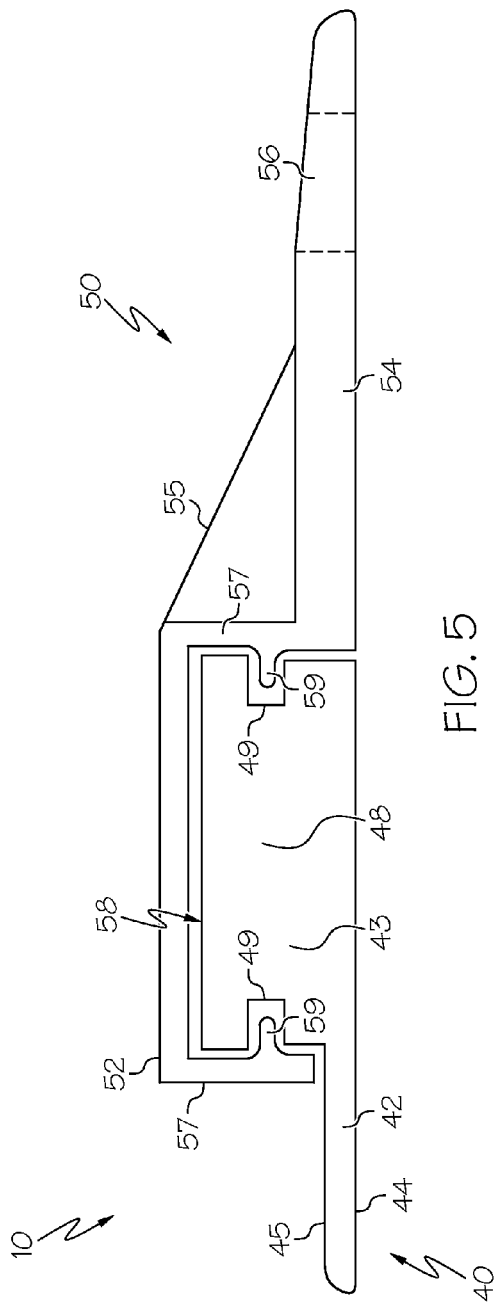
FIG. 5 is a cross-sectional view, taken along section line 5-5 of FIG. 4, of the disclosed mounting assembly.

Referring to FIGS. 3-5, the retainer bracket 50 may be slidably connected to the rail guide 43 by any appropriate or desired manner. For example, the bracket support 52 may include an elongated channel 58. The channel 58 may be defined by a pair of spaced apart sidewalls 57 (e.g., the channel 58 may be bounded on either side by a sidewall 57). The rail guide 43 may include a base 48 projecting outwardly from the top surface 45 of the rail support 42. The base 48 may be configured to engage with the channel 58.

The base 48 may be engaged into the channel 58 in a variety of suitable ways. For example, the base 48 may be engaged into the channel 58 by slidably engaging the channel 58 onto the base 48. The retainer bracket 50 may then be slid along a longitudinal axis X of the rail guide 43 until the retainer bracket 50 is properly positioned with respect to the frame member 32 (e.g. the bracket flange 54 being aligned with a corresponding connection point on the frame member 32) (FIG. 2). Alternately, the bracket support 52 may be positioned near the rail guide 43 and the base 48 may simply be snapped or force-fit into the channel 58.

In an example construction, the base 48 of the rail guide 43 may include a generally I-shaped member connected to and engaged within the channel 58. The base 48 of the rail guide 43 may include a pair of grooves 49 disposed therein defining the I-shaped member. The bracket support 52 may include a pair of retaining members 59. A retaining member 59 may project inwardly from an inner surface of each sidewall 57 of the bracket support 52 into the channel 58. The grooves 49 may be disposed on opposing sides of the base 48 and configured to fittingly receive the retaining members 59 of the bracket support 52. The grooves 49 may extend at least a portion of the length of the rail guide 43. The length of the grooves 49 may define the range of movement of the retainer bracket 50 along the rail 40.

Those skilled in the art will appreciate that the disclosed mounting assembly 10 is not limited to the particular embodiment of the rail 40 and retainer bracket 50 shown in FIGS. 3-5, and the bracket support 52 and rail guide 43 may have a variety of suitable configurations.

For example, referring to FIG. 6, in another example construction, the bracket support 52 may include sloping sidewalls 57 that define the channel 58 having a partial triangular cross-sectional shape. Similarly, the rail guide 43 may include a correspondingly-shaped base 48. Referring to FIG. 7, as another example construction, the bracket support 52 may include a channel 58 having a narrow portion that is located at a position between a bottom wall 60 of the channel 58 and an outer opening 62 of the channel 58. The rail guide 43 may include a base 48 having a corresponding cross-sectional shape. Referring to FIG. 8, as another example, the bracket support 52 may include sidewalls 57 that define the channel 58 having a generally T-shaped cross-sectional shape. The rail guide 43 may include a base 48 having a correspondingly cross-sectional shape including a generally T-shaped member having a cross member 64 and a tie member 66 connecting the cross member to the rail support 42.

Referring again to FIG. 3, in the assembled position, the base 48 of the rail guide 43 may be configured to engage with the cross-sectional shape of the channel 58 such that, under normal operating conditions, the retainer bracket 50 is substantially constrained from movement relative to the rail 40 in directions other than along the longitudinal axis X of the rail guide 43.

Optionally, the ends of the rail guide 43 may be blocked, obstructed, or otherwise secured to prevent undesired movement of retainer bracket 50 along the longitudinal axis X of the rail guide 43. For example, the rail 40 may include a rail stop 68 connected to at least one end of the base 48 of the rail guide 43. The rail stop 68 may limit movement of the retainer bracket 50 in one direction along the longitudinal axis X to prevent the bracket support 52 from sliding off of the body 48 of the rail guide 43.

Once the bracket support 52 has been connected to the rail guide 43 (e.g., by slidably engaging the channel 58 onto the base 48 from an unobstructed end of the base 48), optionally, another rail stop 68 may be connected to the unobstructed end of the base 48 to completely retain the retainer bracket 50 on the rail guide 43.

Referring again to FIG. 3, the rail guide 43 may optionally include one or more interference features 74. The interference features 74 may be configured to partially restrain or slow movement of the retainer bracket 50 along the longitudinal axis X of the rail guide 43. The interference features 74 may be configured in a variety of different ways. For example, the interference features 74 may be configured to temporarily hold the retainer bracket 50 at a selected position along the longitudinal axis X of the rail guide 43, such as by an interference fit or by friction. A relatively small amount of force applied to the retainer bracket 50 along the longitudinal axis X of the rail guide 43 may be sufficient to continue movement of the retainer bracket 50.

Referring to FIG. 9, in an example construction, each interference feature 74 may include a small, shallow recess 76 disposed in a top surface 78 of the body 48 of the rail guide 43. The bracket support 52 may include a small protrusion 80 projecting outwardly from the bottom wall 60 of the channel 58. Each recess 76 may be configured to fittingly receive the protrusion 80 upon alignment of the protrusion 80 with the recess 76 to temporarily hold the retainer bracket 50 in place.

In another example construction, each interference feature 74 may include a small, protrusion projecting outwardly from the top surface 78 of the body 48 of the rail guide 43. The bracket support 52 may include a small, shallow recess 76 disposed in the bottom wall 60 of the channel 58. The recess may be configured to fittingly receive each protrusion upon alignment of the protrusion with the recess to temporarily hold the retainer bracket 50 in place.

In another example construction, the interference features 74 may include a relatively high friction surface configured to frictionally engage the bottom wall 60 of the channel 58 as the bracket support 52 traverses the rail guide 43 along the longitudinal axis X.

Figure 10:
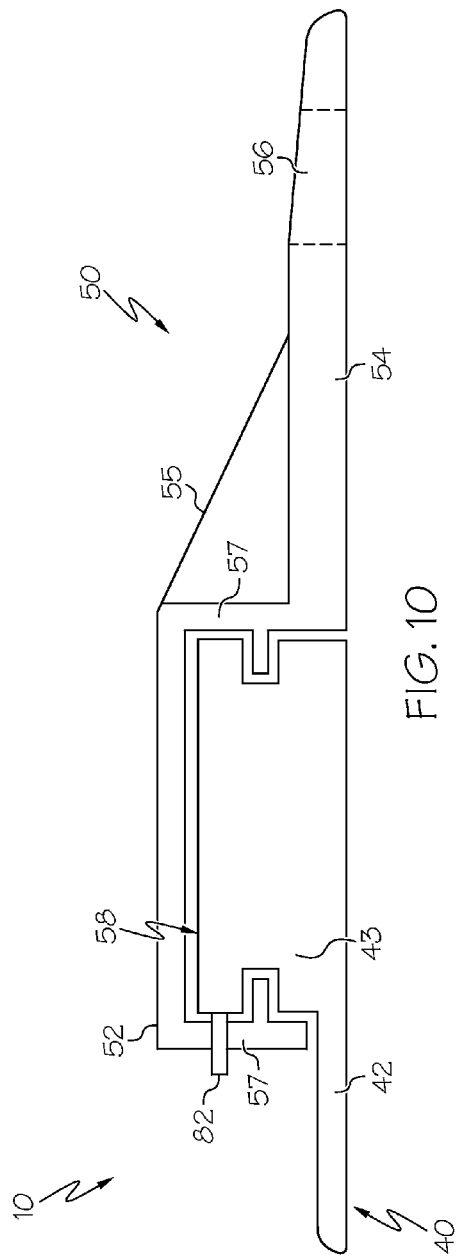
FIG. 10 is a cross-sectional view, taken along section line 5-5 of FIG. 4, of another embodiment of the disclosed mounting assembly.

Referring to FIG. 10, optionally, the retainer bracket 50 may include a fastening mechanism 82 configured secure the retainer bracket 50 to the rail guide 43 at a selected position. For example, once the retainer bracket 50 has been properly positioned with respect to the frame member 32 (e.g. the bracket flange 54 being aligned with a corresponding connection point on the frame member 32) (FIG. 2), the fastening mechanism 82 may be engaged with the rail guide 43 (or the rail support 42) to hold the retainer bracket 50 in place while the bracket flange 54 is connected to the frame member 32. The fastener mechanism 80 may include any suitable device including, but not limited to, a set screw, a spring pin, a clamp, or the like.

Figure 11:
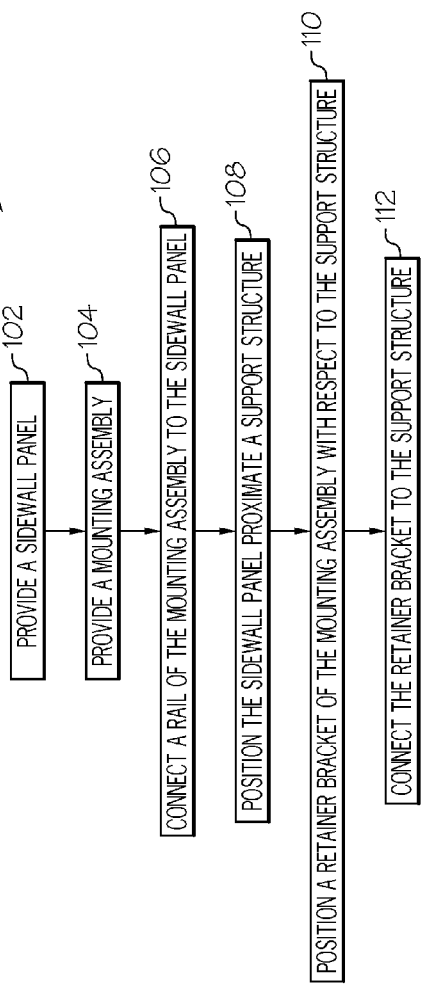
FIG. 11 is flow chart depicting one embodiment of the disclosed method for connecting a sidewall panel to support structure.

Referring to FIG. 11, also disclosed is a method, generally designated 100, for connecting a sidewall panel to a support structure. As shown at block 102, the method 100 may begin with the step of providing a sidewall panel 20 that is to be connected to a support structure 30 to form a wall structure 34 (FIG. 2).

As shown at block 104, at least one mounting assembly 10 (FIG. 1) may be provided. The mounting assembly 10 may include a rail 40 and at least one retainer bracket 50. The retainer bracket 50 may be slidably connected to the rail 40.

As shown at block 106, at least one rail 40 may be connected to the sidewall panel 20. For example, the rail 40 may be connected to a surface (e.g., back surface 22) of the sidewall panel 20 proximate at least one edge 24 of the sidewall panel 20.

As shown at block 108, the sidewall panel 20 may be positioned proximate to the support structure 30 (FIG. 2). For example, at least one edge-end of the sidewall panel 20 may be positioned adjacent to rearwardly positioned frame member 32 of the support structure 30, such that the retainer bracket 50 is proximate the frame member 32.

As shown at block 110, the retainer bracket 50 may be appropriately positioned with respect to the support structure 30. For example, the retainer bracket 50 may be slidably moved along a longitudinal axis X of the rail 40 (FIG. 3) to properly position the retainer bracket 50 with respect to the frame member 32 (e.g. a bracket flange 54 being aligned with a corresponding connection point on the frame member 32) (FIG. 2).

As shown at block 112, the retainer bracket 50 may be connected to the support structure 30. For example, the bracket flange 54 may be fastened to a preselected connection point on the frame member 32 (FIG. 2).

The operations described and illustrated in blocks 102-112 may be repeated for connection of additional sidewall panels 20 to the support structure 30 until the wall structure 34 (FIG. 2) is completed.

Figure 12:
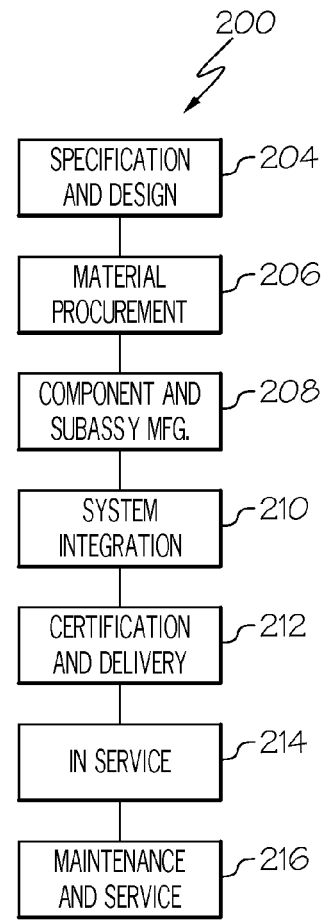
FIG. 12 is a flow diagram of aircraft production and service methodology.
Figure 13:
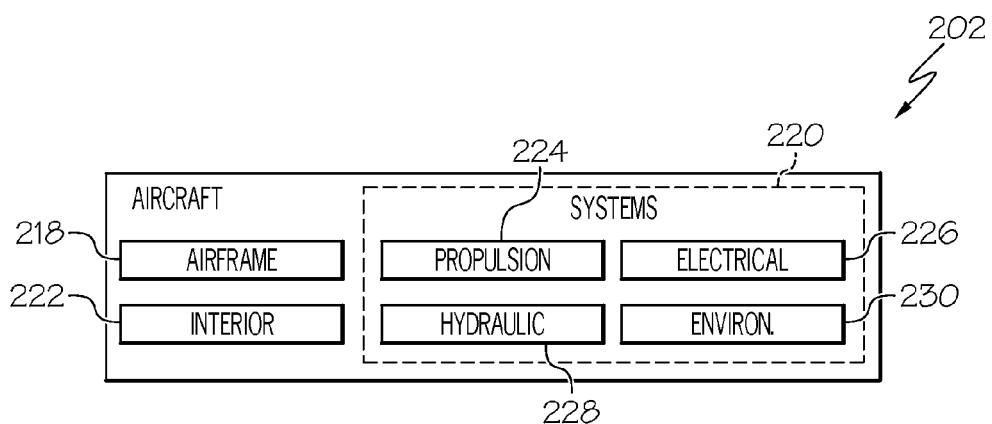
FIG. 13 is a block diagram of an aircraft.

Examples of the disclosure may be described in the context of an aircraft manufacturing and service method 200, as shown in FIG. 12, and an aircraft 202, as shown in FIG. 13. During pre-production, example method 200 may include specification and design 204 of the aircraft 202 and material procurement 206. During production, component and subassembly manufacturing 208 and system integration 210 of the aircraft 202 takes place. Thereafter, the aircraft 202 may go through certification and delivery 212 in order to be placed in service 214. While in service by a customer, the aircraft 202 is scheduled for routine maintenance and service 216, which may also include modification, reconfiguration, refurbishment and the like.

Each of the processes of method 200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 13, the aircraft 202 produced by example method 200 may include an airframe 218 with a plurality of systems 220 and an interior 222. Examples of high-level systems 220 include one or more of a propulsion system 224, an electrical system 226, a hydraulic system 228, and an environmental system 230. Any number of other systems may be included. Although an aerospace example is shown, the principles of the invention may be applied to other industries, such as the automotive industry.

Apparatus and methods embodied herein may be employed during any one or more of the stages of the production and service method 200. For example, components or subassemblies corresponding to production process 208 may be fabricated or manufactured in a manner similar to components or subassemblies produced while the aircraft 202 is in service. Also, one or more apparatus examples, method examples, or a combination thereof may be utilized during the production stages 208 and 210, for example, by substantially expediting assembly of or reducing the cost of an aircraft 202. Similarly, one or more of apparatus examples, method examples, or a combination thereof may be utilized while the aircraft 202 is in service, for example and without limitation, to maintenance and service 216.

Accordingly, the disclosed mounting assembly may advantageously provide a simplified, more efficient method for attaching sidewall panels 20 to adjoining support structures 30. The number of parts involved in the installation is substantially decreased, along with the number of tools required for the operation, in comparison existing methods. For example, the efficiency of the process of installing sidewall panels within vehicles, including within an interior cabin of an aircraft, may be improved, and the amount of labor and expense involved in the operation reduced.

Although various embodiments of the disclosed mounting assembly have been shown and described, modifications may occur to those skilled in the art upon reading the specification. The present application includes such modifications and is limited only by the scope of the claims.

What is claimed is:

1. A mounting assembly comprising:
   a rail connected to a sidewall panel, said sidewall panel comprising a surface and a perimeter edge, said rail comprising:
      a longitudinal axis;
      a rail support connected to said surface of said sidewall panel proximate said perimeter edge of said sidewall panel, said rail support comprising a bottom surface and a top surface; and
      a rail guide extending from said top surface of said rail support, said rail guide comprises a body, said body comprising a pair of grooves disposed in sides of said body; and
   a retainer bracket moveably connected to said rail, said retainer bracket comprising:
      a bracket support comprising a spaced apart pair of sidewalls defining a channel, each of said sidewalls comprising a retaining member projecting into said channel, said channel receivably engages said rail guide, and said grooves receive said retaining members; and
      a bracket flange extending outwardly from one of said spaced apart pair of sidewalls of said bracket support and extending past said rail,
   wherein said retainer bracket is freely movable along said longitudinal axis to a plurality of positions relative to said rail when connected to said rail, and
   wherein said bracket flange is connected directly to a support structure at a selected position of said plurality of positions.

2. The assembly of claim 1 wherein said rail comprises a length, and wherein said retainer bracket is moveable along at least a portion of said length.

3. The assembly of claim 1 wherein said rail comprises a length, and wherein said retainer bracket is moveable along substantially all of said length.

4. The assembly of claim 1 wherein said body comprises a shape corresponding to a cross-sectional shape of said channel, such that said retainer bracket is slidable along a longitudinal axis of said rail guide.

5. The assembly of claim 1 wherein said rail guide comprises a rail stop disposed on at least one end thereof, said rail stop obstructing movement of said bracket support along a longitudinal axis of the rail guide.

6. The assembly of claim 1 wherein said rail guide comprises a plurality of interference features, said interference features holding said bracket support at said selected position along said longitudinal axis relative to said rail guide.

7. The assembly of claim 1 wherein said retainer bracket comprises a fastening mechanism, said fastening mechanism engaging said rail guide to secure said bracket support at said selected position along said rail guide.

8. The assembly of claim 1 wherein said support structure comprises an airframe of an aircraft.

9. A mounting assembly comprising:
   a sidewall panel comprising a first surface, a second surface, and a perimeter edge;
   a rail connected to said sidewall panel, said rail comprising:
      a longitudinal axis;
      a rail support connected to said first surface of said sidewall panel proximate said perimeter edge of said sidewall panel, said rail support comprising a bottom surface and a top surface; and
      a rail guide extending from said top surface of said rail support, said rail guide comprises a body, said body comprising a pair of grooves disposed in sides of said body; and
   a retainer bracket slidably connected to said rail, said retainer bracket comprising:
      a bracket support comprising a spaced apart pair of sidewalls defining a channel, each of said sidewalls comprising a retaining member projecting into said channel, said channel receivably engages said rail guide, and said grooves receive said retaining members; and a bracket flange extending outwardly from one of said spaced apart pair of sidewalls of said bracket support and extending past said rail and said perimeter edge of said sidewall panel, wherein said retainer bracket is freely slidable along said longitudinal axis to a plurality of positions on said rail relative to said perimeter edge when connected to said rail, and wherein said bracket flange is connected to an airframe at a selected position of said plurality of positions.

10. The assembly of claim 9 wherein said bottom surface contacts only said first surface of said sidewall panel.

11. The assembly of claim 9 wherein said body comprises a shape corresponding to a cross-sectional shape of said channel, such that said retainer bracket is slidable along a longitudinal axis of said rail guide.

12. The assembly of claim 9 wherein said rail guide comprises a length, and said retainer bracket slides along at least a portion of said length of said rail guide.

13. The assembly of claim 9 wherein said bottom surface of said rail support is affixed directly to said first surface proximate said perimeter edge of said sidewall panel.

14. The assembly of claim 9 wherein said bracket flange is connected directly to said airframe of an aircraft.

15. A method for connecting a sidewall panel to a support structure, said sidewall panel comprising a surface and a perimeter edge, said method comprising:

connecting a rail to a sidewall panel, said rail comprising:
a longitudinal axis;
a rail support connected to said surface of said sidewall panel proximate said perimeter edge of said sidewall panel, said rail support comprising a bottom surface and a top surface; and
a rail guide extending from said top surface of said rail support, said rail guide comprises a body, said body comprising a pair of grooves disposed in sides of said body;

moveably connecting a retainer bracket to said rail, said retainer bracket comprising:
a bracket support comprising a spaced apart pair of sidewalls defining a channel, each of said sidewalls comprising a retaining member projecting into said channel, said channel receivably engaging said rail guide, and said grooves receive said retaining members; and
a bracket flange extending outwardly from one of said spaced apart pair of sidewalls of said bracket support and extending past said rail,
wherein said retainer bracket is freely movable along said longitudinal axis to a plurality of positions relative to said rail when connected to said rail, and
wherein said bracket flange is connected directly to a support structure at a selected position of said plurality of positions;

positioning said sidewall panel proximate said support structure;
positioning said retainer bracket with respect to said support structure; and
connecting said retainer bracket to said support structure.

* * * * *